United States Patent Office 3,205,202
Patented Sept. 7, 1965

---

3,205,202
PROCESS FOR IMPROVING THE BRIGHTNESS OF SYNTHETIC POLYMERS AND PRODUCTS RESULTING THEREFROM
Robert Schnegg and Erich Istel, Dormagen, and Heinrich Gold, Cologne-Stammheim, Germany, assignors to Farbenfabriken Bayer Aktiengesellschaft, Leverkusen, Germany, a corporation of Germany
No Drawing. Filed Aug. 7, 1956, Ser. No. 602,505
Claims priority, application Germany Aug. 10, 1955
4 Claims. (Cl. 260—78)

The present invention relates to a process for improving the brightness of synthetic polymers and products resulting therefrom; more particularly it concerns a process which consists in reacting synthetic polymers, especially polyamides, polyurethanes or polyesters, with brightening agents containing groups capable of reacting with the synthetic polymers. The process of the invention may be modified in that instead of the synthetic polymers, the components to be used for their production are reacted with the brightening agents.

Groups which are capable of reacting with the synthetic polymers or their components are particularly carboxyl groups, amino groups, alcoholic hydroxyl groups, ester groups and isocyanate groups.

Brightening agents suitable for carrying the present invention into effect are for example the following compounds:

(a) 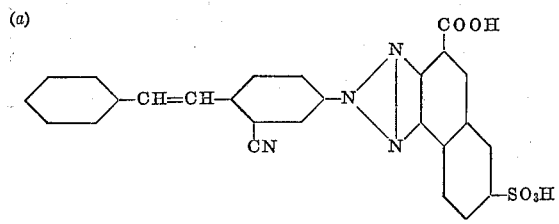

(b) 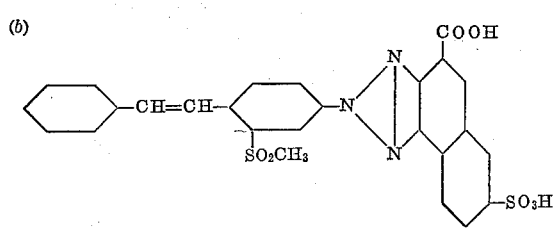

(c) 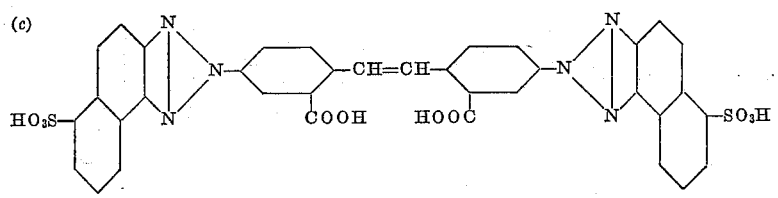

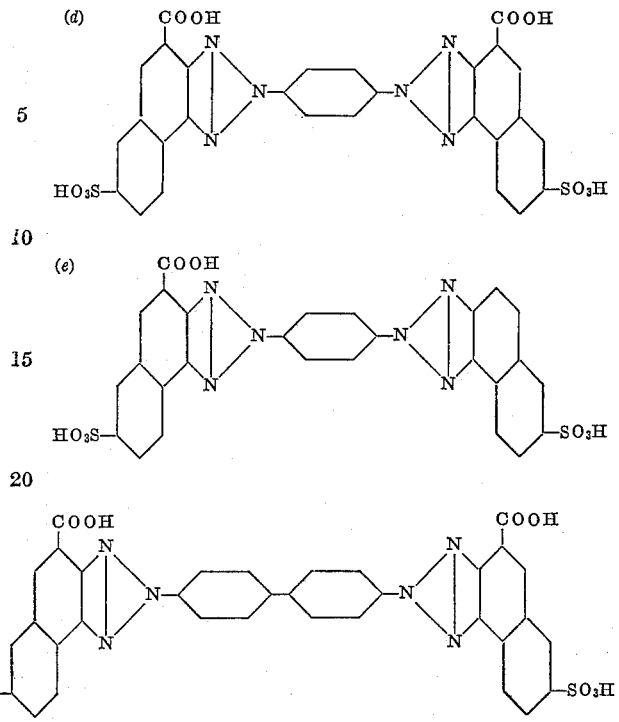

Suitable proportions for each case may easily be established by preliminary experiments; indications may be derived from the following examples which also illustrate in more detail various methods of carrying out the present invention without, however, limiting the scope thereof.

The brightening effects obtainable according to the invention in synthetic polymers are distinguished by an especially good fastness to washing; this property is especially advantageous when the polymers are worked up into textile materials. In addition to the brightening agents other substances, e.g. pigments, may also be used.

*Example 1*

1500 kilograms of caprolactam, a dispersion of 4.5 kilograms of titanium dioxide in 45 kilograms of water, 3.75 kilograms of acetic acid and 0.5 kilogram of the brightening agent (a) are heated in a polymerization autoclave to 260° C. with stirring. Upon reaching this temperature, the pressure in the autoclave is slowly released and the autoclave evacuated in the course of 2 hours while stirring. The polyamide is worked up in conventional manner into shreds, filaments, fibers, bristles or injection mouldings. The articles thus obtained have a considerably whiter appearance than those products obtained without the addition of the brightening agent.

The brightening agent indicated under (a) was prepared by diazotizing 4-amino-2-cyanostilbene obtainable by reduction from 4-nitro-2-cyanostilbene, combining the diazo compound with 3-carboxy-2-aminonaphthalene-6-sulfonic acid to give the azo dyestuff, and subsequently oxidizing the azo dyestuff with ammoniacal copper sulfate solution.

*Example 2*

56 kilograms of caprolactam are melted in a vessel and converted into a homogeneous dispersion by first adding 40 kilograms of titanium dioxide with vigorous stirring; 4 kilograms of the brightening agent (b) are then added, and the mixture is thereupon heated after the addition of 2 kilograms of water under pressure and with stirring at a temperature of about 260° C.

The heating is continued for some time without pressure, the polymer thus formed is cast to cables of about 3 millimeters diameter and cut into shreds.

The shreds containing a high concentration of the brightening agent are then added in a proportion of 1:100 to a polyamide produced from 10,000 kilograms of caprolactam, 50 kilograms of benzoic acid and 100 kilograms of water in a continuous polymerization plant according to co-pending application Ser. No. 527,234, now U.S. Patent Number 2,889,211, filed August 9, 1955, by Wolf Rodenacker, Erich Istel and Robert Schnegg, which application is assigned to the same assignee. The shreds are added in such a manner that they are continuously melted with the aid of a heated worm and intimately mixed with the polyamide by means of a mixing worm according to British Patent 729,584. The mixture thus obtained may then be processed into any shaped body. The shaped bodies, which have a dull finish, possess an intensely white appearance.

When shreds are used which are produced according to the above instructions without the addition of titanium dioxide and added to the said polyamide in a ratio of 1:2, shaped bodies are obtained without a dull finish which also possess an intensely white appearance.

When instead of the brightening agent (b), the brightening agent (c) is used, products are obtained having likewise a white appearance.

The brightening agent (b) was obtained in the following manner: benzaldehyde was condensed with 2-methyl-5-nitrophenylsulfone in the presence of piperidine, the 4-nitrostilbyl-(2)-methylsulfone thus obtained was reduced to give 4-aminostilbyl-(2)-methylsulfone, the amino compound was diazotized, the diazo compound combined with 3-carboxy-2-aminonaphthalene-6-sulfonic acid to give the azo dyestuff and the azo dyestuff was then oxidized with ammoniacal copper sulfate solution.

The brightening agent (c) was produced by combining 1 mol of tetrazotized 4,4'-diaminostilbene-2,2'-dicarboxylic acid with 2 mols of 2-naphthylamine-5-sulfonic acid and oxidizing the diazo dyestuff thus obtained with ammoniacal copper sulfate solution.

*Example 3*

60 kilograms of hexane-diamineadipate, 40 kilograms of water, 0.2 kilogram of acetic acid, 0.3 kilogram of titanium dioxide and 0.2 kilogram of the brightening agent (c) are slowly heated in a polymerization autoclave to 270–280° C. in a nitrogen atmosphere. Condensation takes place thereby and a pressure of about 15 atmospheres is produced. By releasing the pressure, the water is removed to a large extent in usual manner, and the melt is evacuated. The dull shaped bodies produced from the polyamide are intensely white.

*Example 4*

540 kilograms of butanediol-1,4 are mixed with stirring with 979 kilograms of hexane-di-isocyanate in an autoclave, and subsequently treated with 4.5 kilograms of titanium dioxide and 0.4 kilogram of the brightening agent (c). The mixture is then heated to 200–210° C. with stirring for about 1 hour and finally worked up into filaments, bristles or other shaped bodies. The products thus obtained are intensely white.

*Example 5*

1,500 kilograms of caprolactam, a dispersion of 4.5 kilograms of titanium dioxide in 45 kilograms of water, 3.75 kilograms of acetic acid and 0.5 kilogram of the brightening agent (d) are heated in a polymerization autoclave to 260° C. with stirring. After standing for 6 hours the polyamide is worked up in conventional manner into shreds, filaments, fibres, bristles or injection moldings. The articles thus obtained have a considerable whiter appearance than those products obtained without the addition of the brightening agent.

The brightening agent indicated under (d) was obtained in the following manner: 4-nitro-aniline was diazotized, the diazo compound was combined with 3-carboxy-2-aminonaphthalene-6-sulfonic acid, the ortho-amino azo dyestuff obtained was oxidized with ammoniacal copper sulfate solution, the 6'-sulfo-3-carboxynaphtho-(1',2';4,5)-triazolyl-4-nitrobenzene was reduced with iron and acetic acid, the amine formed was diazotized, the diazo compound was then again combined with 3-carboxy-2-aminonaphthalene-6-sulfonic acid and the ortho-amino azo dyestuff was oxidized with ammoniacal copper sulfate solution.

A similar brightening effect can be obtained by using the brightening agent (e) instead of the brightening agent (d). The brightening agent (e) can be produced by reducing the above mentioned 6'-sulfo-3-carboxynaphtho-(1',2';4,5)-triazolyl-4-nitrobenzene, diazotizing the amine formed and combining the diazo compound with 2-aminonaphthalene-6-sulfonic acid and oxidizing the ortho-amino azo dyestuff formed by means of ammoniacal copper sulfate solution.

*Example 6*

The procedure described in Example 5 was followed by applying the brightening agent (f) instead of the brightening agent (d). The articles obtained likewise possess an intensely white appearance.

The brightening agent (f) was prepared in the following manner: benzidine was tetrazotized, the tetrazo compound was combined with 3-carboxynaphthalene-2-aminosulfonic acid and the ortho-amino diazo dyestuff obtained was oxidized with ammoniacal copper sulfate solution.

We claim:

1. In a process for producing a synthetic polymer comprising polymerizing caprolactam in the presence of a minor amount of a pigment and an acid at a temperature of about 260° C. and under pressure in an autoclave, the improvement comprising incorporating in the reaction mixture an optical bleaching agent selected from the group consisting of

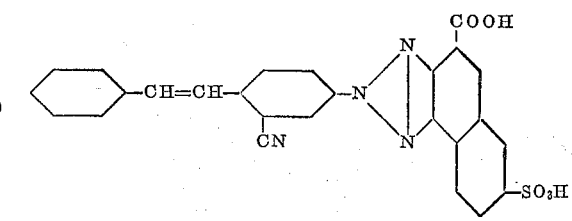

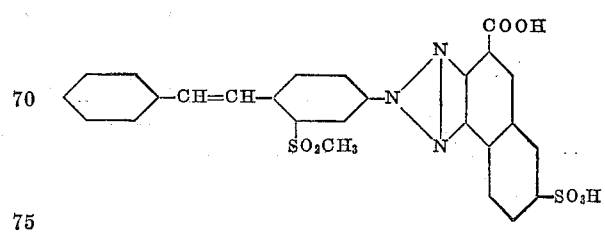

and

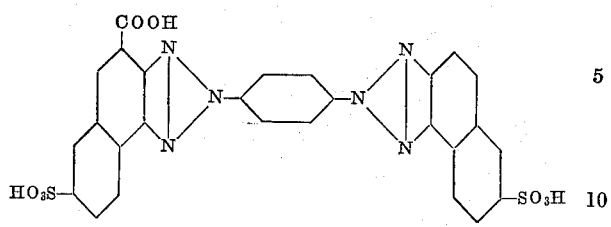

2. In a process for producing a synthetic polymer, comprising polymerizing hexamethylene diamine adipate in the presence of a minor amount of a pigment and an acid at a temperature of about 260° C. and under pressure in an autoclave, the improvement comprising incorporating in the reaction mixture an optical bleaching agent selected from the group consisting of

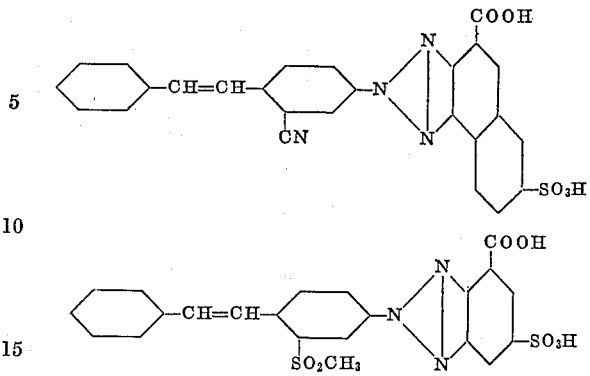

and

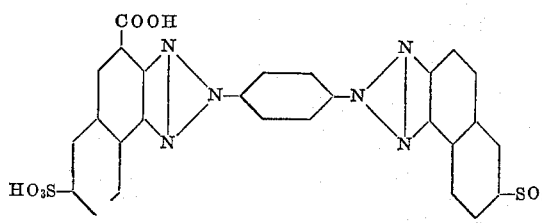

3. In the polymerization of caprolactam to a synthetic polyamide, the step of incorporating into the reaction mixture an optical bleaching agent selected from the group consisting of

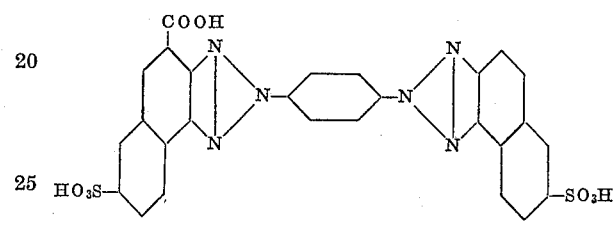

and

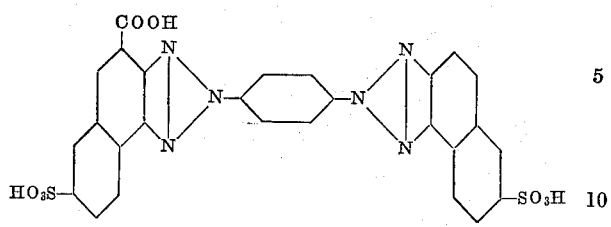

whereby an effective amount of said optical bleaching agent is chemically combined with the polymer formed in the reaction.

4. Process of claim 1 wherein the product of this reaction is formed into filaments and said filaments are shredded and intimately mixed with a second polyamide by melting and agitating, whereby an effective amount of the optical bleaching agent contained in the first polyamide imparts its brightening action to the entire mixture.

References Cited by the Examiner

UNITED STATES PATENTS

| | | | |
|---|---|---|---|
| 2,498,592 | 2/50 | Switzer et al. | |
| 2,498,593 | 2/50 | Switzer et al. | |
| 2,630,421 | 3/53 | Stamatoff et al. | 260—78 |
| 2,657,195 | 10/53 | Toland | 260—78 |
| 2,666,062 | 1/54 | Brunner et al. | 260—308 |
| 2,668,777 | 2/54 | Gold et al. | 260—308 |
| 2,732,301 | 1/56 | Robertson et al. | 96—115 |
| 2,739,139 | 3/56 | Gabler et al. | 260—78 |
| 2,747,997 | 5/56 | Smith et al. | 96—115 |
| 2,784,183 | 3/57 | Keller et al. | 260—308 |
| 2,875,047 | 2/59 | Oster | 96—115 |

LEON J. BERCOVITZ, Primary Examiner.

PHILIP MANGAN, MILTON STERMAN, H. N. BURSTEIN, LOUISE P. QUAST, Examiners.